United States Patent [19]

Freyer et al.

[11] 4,243,002

[45] Jan. 6, 1981

[54] FUEL INJECTION SYSTEM FOR AN INTERNAL COMBUSTION ENGINE

[75] Inventors: Erwin Freyer, Neckarsulm; Johannes Steinwart, Obersulm-Willsbach; Peter Will, Bad Rappenau, all of Fed. Rep. of Germany

[73] Assignee: Audi NSU Auto Union Aktiengesellschaft, Neckarsulm/Württ, Fed. Rep. of Germany

[21] Appl. No.: 915,676

[22] Filed: Jun. 15, 1978

[30] Foreign Application Priority Data

Jul. 6, 1977 [DE] Fed. Rep. of Germany ....... 2730386

[51] Int. Cl.[3] ..................... F02M 39/00; F02D 31/00; F16D 23/00

[52] U.S. Cl. ........................... 123/325; 261/DIG. 19; 192/0.084; 123/454

[58] Field of Search ......... 123/97 B, 103 R, 139 AW; 192/0.084, 0.062; 261/DIG. 19; 74/860, 857, 858

[56] References Cited

U.S. PATENT DOCUMENTS

| | | | |
|---|---|---|---|
| 2,064,579 | 12/1936 | Werner | 192/0.062 |
| 2,886,020 | 5/1959 | Wolfe | 123/97 B |
| 3,349,644 | 10/1967 | Gish | 123/97 B |
| 3,374,991 | 3/1968 | Walker | 261/DIG. 19 |
| 3,486,594 | 12/1969 | Wren | 192/0.084 |
| 3,817,229 | 6/1974 | Stump | 123/97 B |
| 3,906,909 | 9/1975 | Garcea | 123/97 B |
| 3,948,116 | 4/1976 | Van Pelt | 74/860 |

FOREIGN PATENT DOCUMENTS

| | | | |
|---|---|---|---|
| 2340480 | 2/1975 | Fed. Rep. of Germany | 123/139 AW |
| 2435840 | 2/1976 | Fed. Rep. of Germany | 123/139 AW |
| 2551340 | 5/1977 | Fed. Rep. of Germany | 123/139 AW |

*Primary Examiner*—Charles J. Myhre
*Assistant Examiner*—Carl Stuart Miller
*Attorney, Agent, or Firm*—Kane, Dalsimer, Kane, Sullivan and Kurucz

[57] ABSTRACT

A fuel injection system for an internal combustion engine includes an air suction pipe, a throttle valve located in the pipe, and a member, upstream of the throttle valve, which is actuatable by air flowing through the suction pipe so as to move a piston valve to dose a quantity of fuel to a fuel injection nozzle. The system includes a duct which bypasses the throttle valve, the duct having a valve which closes the duct when the throttle valve is closed and when the engine is above the idling speed. Dosing of fuel is thereby stopped during coasting of a vehicle, leading to decreased fuel consumption.

7 Claims, 1 Drawing Figure

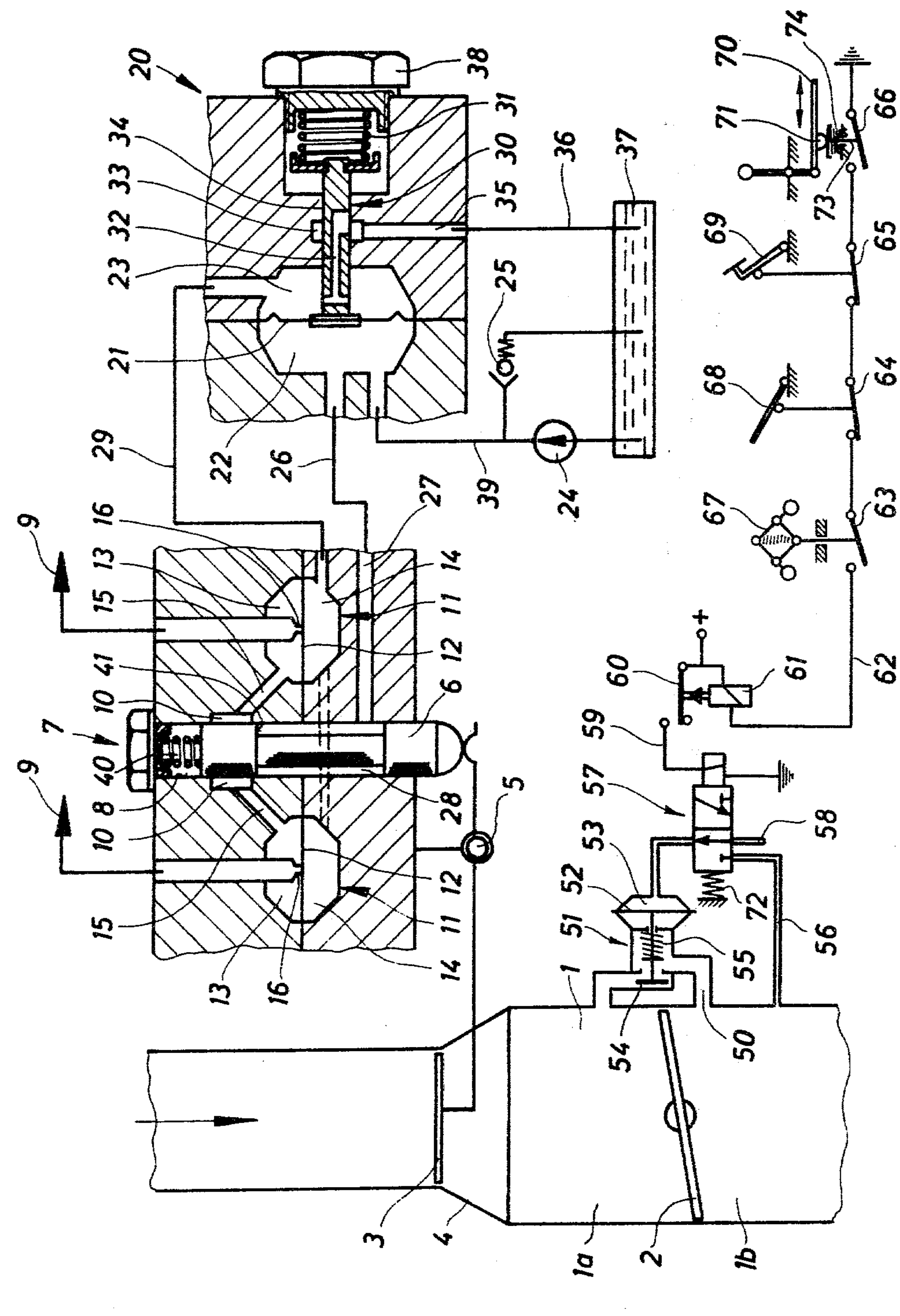
20
38
31
30
34
33
32
23
35
36
37
21
25
22
26
29
39
24
27
16
13
15
14
11
12
41
10
7
40
8
6
28
9
5
60
+
61
62
59
57
58
53
52
51
55
72
56
1
54
50
3
4
1a
2
1b
67
63
68
64
69
65
70
74
71
66
73

FUEL INJECTION SYSTEM FOR AN INTERNAL COMBUSTION ENGINE

The invention relates to a fuel injection system for an internal combustion engine. Fuel injection systems usually contain bypass ducts, whose function is to allow air to flow therethrough during idling, when the throttle valve is closed, and to produce a deflection of a measuring member in an air suction pipe which is proportional to the air flow through the pipe so as to achieve an appropriate dosing of the fuel to the fuel injectors.

In such fuel injection systems, the engine speed is higher than the idling speed during coasting, during which the throttle valve is closed, and the measuring member in the suction pipe is deflected by an amount which depends upon the quantity of air sucked in. A large deflection of the measuring member results in a correspondingly large dosing of fuel which leads to increased fuel consumption and increases the proportion of injurious material in the exhaust gas.

The object of the present invention is to produce a fuel injection system in which cutting-off of the fuel takes place reliably during coasting.

Broadly speaking, the present invention provides a fuel injection system for an internal combustion engine having continuous fuel injection into a suction pipe, comprising a suction pipe, a throttle valve located in the suction pipe and, upstream of the throttle valve, a member actuatable by air flowing through the suction pipe so as to dose fuel to the engine, and further comprising a duct which bypasses the throttle valve, in which duct there is located a duct valve which closes the duct when the throttle valve is closed and when the engine speed is above the idling speed. By means of the system of the invention, dosing of the fuel is stopped only during coasting of the vehicle, that is immediately when coasting starts, and independently of the state of the internal combustion engine.

If the fuel injection system of the invention is used for an internal combustion engine which drives a vehicle with a clutch and gear box, an error function may certainly occur if the throttle valve is opened by brief depression of the accelerator pedal with an uncoupled clutch and/or disengaged gear, so that the engine speed rises considerably above the idling speed. There then occurs for a short while a state in which the throttle valve is closed and the engine speed is above the idling speed, so that the valve in the bypass is actuated and the fuel supply is unintentionally cut off. In order to prevent this theoretically possible erroneous actuation, the valve can also be actuated in dependence upon the state of the clutch and the gear box in such a way that it shuts off the bypass duct only if the clutch is also engaged and one gear of the gear box is engaged. By this means, the valve is actuated only if all criteria of coasting are present, namely engaged clutch, engaged gear, closed throttle valve and an engine speed above the idling speed.

Hence, according to a further aspect of the invention there is provided a fuel injection system for use with a vehicle having a clutch and a gear box, wherein the duct valve is so arranged that it shuts off the bypass duct if the clutch and one gear of the gear box are engaged. The duct valve may be a solenoid valve or a diaphragm valve which can be controlled by a solenoid valve, and a first switch which can be actuated with an engaged clutch, a second switch which can be actuated with an engaged gear, a third switch which can be actuated with a closed throttle valve and a fourth switch, which can be actuated with an engine speed above the idling speed may be provided in a circuit in which the solenoid valve or a relay controlling the circuit of the solenoid valve is located. The use of a diaphragm valve instead of a solenoid valve has the advantage that in a diaphragm valve, the opening and closing actions take place gradually rather than suddenly, so that vibrations in the suction pipe are avoided.

The duct valve is preferably connected through the solenoid valve to a point on the suction pipe downstream of the throttle valve or to the atmosphere, as desired. In contrast to the known slide valve which operates in dependence upon the low pressure of the suction pipe, the low pressure of the suction pipe is not used as a controlling condition, but merely as an actuating means for the valve.

A preferred embodiment of the invention is now described, by way of example, with reference to the accompanying drawing, which shows a diagrammatic sectional view of a fuel injection system according to the invention for an internal combustion engine to drive a vehicle having a clutch and gear box.

Referring to the drawing there is shown a suction pipe 1 of a mixture-compressing, externally ignited internal combustion engine, the pipe containing a throttle valve 2, which can be actuated as desired, and a measuring member 3, which is actuated by air flowing through the pipe 1 in the direction of the arrow. The measuring member 3 is in the form of a plate and is located at the upper end of a frusto-conical section 4 of the suction pipe 1. The plate 3 is pivotably mounted on a shaft 5 and actuates a movable piston valve 6 of a fuel dosing valve 7. The piston valve 6 is located in a cylindrical bore 8, in whose wall a number of guide slots 10 is provided, corresponding to the number of injection nozzles indicated by arrows 9. Behind each guide slot 10 is connected a constant pressure valve 11, which has two chambers 13 and 14 separated from each other by a diaphragm 12. Each chamber 13 is in communication through a duct 15 with a corresponding guide slot 10, and via a valve aperture 16 controlled by the diaphragm 12, is in communication with an injection nozzle 9. Common to all the constant pressure valves 11 is a differential pressure control valve 20, which has two chambers 22 and 23 separated from each other by a diaphragm 21. The chamber 22 is charged by an electrically driven fuel pump 24 with fuel under system pressure which is determined by a system pressure holding valve 25. The chamber 22 is also in communication via a pipeline 26 and a duct 27 with an annular groove 28 in the piston valve 6 of the fuel dosing valve 7. The second chamber 23 of the differential pressure control valve 20 is connected by a pipeline 26 to the second chambers 14 of all the constant pressure valves 11. The pressure in the chamber 23, which determines the differential pressure at the dosing valve 7, is controlled by a valve body 30, which is pressed by a spring 31 against the diaphragm 21 of the differential pressure control valve 20 and has a bore 32 which is in communication with the chamber 23 and which, according to the position of the valve body 30, comes more or less into communication with an annular groove 33 in the wall of the bore 34 which accepts the valve body 30. The annular groove 33 is in communication with the fuel tank 37 via a duct 35 and a return flow pipeline 36. The tension in the spring 31, which is adjustable by means of a screw 38, determines the height of the differential pressure at the dosing valve 7.

The fuel conveyed by the fuel pump 24 passes through the pipeline 39 into the first chamber 22 of the differential pressure control valve 20, and from there through the pipeline 26 and the duct 27 into the annular groove 28 of the piston valve 6. The piston valve 6 is moved upwards by downward movement of the plate 3 caused by air flowing through the suction pipe 1 and impinging on the plate and counter to an adjusting force which is created by a spring 40. The upward movement of valve 6 permits guide edge 41 to move to a position where groove 28 communicates with slots 10. The fuel in groove 28 now passes through the slots 10 and ducts 15 into the first chambers 13 of the constant pressure valves 11, from where it flows through the valve apertures 16 to the appropriate injection nozzles 9.

The suction pipe 1 is provided with a duct 50 which bypasses the throttle valve 2 and which connects the suction pipe section 1*a* situated upstream of the throttle valve 2 to the suction pipe section 1*b* situated downstream of the throttle valve 2. The quantity of air required for idle running of the internal combustion engine can flow through the duct 50 with the throttle valve 2 closed, whereby this air produces a deflection of the plate 3, the result of which is a corresponding dosing of fuel to the injection nozzles 9 by the fuel dosing valve 7. In order to obtain a cutting-off of the fuel supply during coasting, there is provided in the bypass duct 50 a stop valve 51 which shuts off the bypass duct 50 during coasting. Any noticeable air flow through the suction pipe 1 is thereby prevented and a deflection of the plate 3 is avoided. The stop valve 51 is constructed as a diaphragm valve in the exemplified embodiment, and has a diaphragm 52 which defines a low pressure chamber 53 and is connected to a valve body 54 which is normally raised from its seat by a spring 55. The chamber 53 during coasting is connected to the suction pipe section 1*b* downstream of the throttle valve 2, and the low pressure which then prevails in the chamber 53 overcomes the force of the spring 55 and draws the valve body 54 onto its seat, whereby the bypass duct 50 is shut off. The pipeline 56 is controlled by a three-way solenoid valve 57, which assumes the position shown, in all operating conditions with the exception of coasting, in which position the low pressure chamber 53 is connected to a ventilation pipeline 58 which discharges into the atmosphere, so that the stop valve 51 is in its open position. In the circuit 59 of the winding of the solenoid valve 57 is located a switch 60 of a relay 61, which, when the relay 61 is actuated, closes the switch 59 and brings the solenoid valve 57 into the second position, in which the low pressure chamber 53 is connected to the suction pipe section 1*b* via the pipeline 56.

Four switches 63, 64, 65 and 66 are connected in series in the circuit 62 of the relay 61. The switch 63 is under the influence of a symbolically indicated speed control device 67 and is closed when the engine speed is above the idling speed. The switch 64 is connected to the accelerator pedal 68 or to rod linkage leading from the latter to the throttle valve 2 and is closed when the throttle valve 2 is closed. The switch 65 is connected to the clutch pedal 69 or another part of the clutch control system and is closed when the clutch is in the engaged state. The switch 66 is actuated by the gear selector linkage 70 of the gear box, that is to say, it is opened when the gear box is in the neutral position, but is closed when one gear is engaged.

The position of the switches 63 to 66 which is shown corresponds to the idling state of the driving mechanism of the vehicle. The engine speed corresponds to the idling speed, so that the switch 63 is opened. The accelerator pedal 68 is unloaded, so that the switch 64 is closed. The clutch pedal 69 is not loaded, and the clutch therefore not engaged, so that the switch 65 is closed. The gear mechanism is in its neutral position, in which the cam 71 on the gear selector linkage 70 opens the switch 66. The circuit 62 of the relay 61 is broken by the open switches 63 and 66, the switch 60 is therefore opened and the winding of the solenoid valve 57 is free of current, whereby the solenoid valve is pressed by means of the spring 72 into the position shown, in which the low pressure chamber 53 of the stop valve 51 is ventilated and the low pressure pipeline 56 is shut off. The bypass duct 50 is thus opened and the plate 3 is deflected according to the throughput of air during idling, in order to dose an appropriate quantity of fuel. One of the switches 63 to 66 is also opened in every other running state, with the exception of coasting, so that the stop valve 51 is opened. During coasting, on the other hand, the engine speed is above the idling speed, so that the switch 63 is closed. The accelerator 68 is at rest and the switch 64 is also closed. The clutch is engaged and the switch 65 is therefore closed. Finally, the switch 66 is also closed, as one gear of the gear box is engaged and the cam 71 also releases the rod 73 of the switch 66, and the latter can move into its closing position through the action of the spring 74. During coasting, the circuit 62 of the relay 61 is therefore closed, whereby the switch 60 closes the circuit 59 of the solenoid valve 57, and the solenoid valve is moved to the left in the drawing, counter to the action of the spring 72. In this position, the low pressure chamber 53 of the stop valve 51 is connected to the suction pipe section 1*b*, whereby the valve body 54 is drawn onto its seat and shuts off the bypass duct 50.

Many modifications of the illustrated embodiment of the invention are possible without departing from the scope of the invention. In a simplified construction, the switches 65 and 66 can be omitted, but there then exists the possibility of erroneous actuation and unintentional cutting-off of the fuel supply when the accelerator pedal 68 is pressed down for a short while in the neutral position of the gear box or when the clutch is disengaged, as a result of which the engine speed is increased above the idling speed, and then released again. The speed-dependent switch 63 is thereby closed and—as the accelerator pedal 68 is brought back into its resting position—the circuit 62 is closed, whereby the stop valve 51 is actuated until the engine speed has fallen to the idling speed and the switch 63 is opened again.

The relay 61 with the switch 60 is provided only for reasons of circuit technology. Basically, it would be possible to connect up the switches 63 to 66 directly to the circuit 59 of the solenoid valve 57. It would also be possible, instead of the diaphragm valve 51, to provide a solenoid valve in the bypass duct 50, to whose circuit the switches 63 to 66 could be connected up. Because of the gentler reaction of a diaphragm valve, the latter is, however, to be preferred.

We claim:

1. A fuel injection system for an internal combustion engine with continuous fuel injection into a suction pipe for use with a vehicle having a clutch and gear box having at least one gear, said system comprising:

a suction pipe;

a throttle valve located in the suction pipe;

a member upstream of the throttle valve, said member being actuatable by air flowing through the suction pipe so as to dose fuel to the engine;

a duct which bypasses the throttle valve;

a duct valve located in said duct capable of closing off said duct;

a control means for controlling the operation of the duct valve, with said means including: a first switch and means for actuating said first switch when the clutch is engaged; a second switch and means for actuating said second switch when a gear of the gear box is engaged; a third switch and means for actuating said third switch when the throttle valve is closed; a fourth switch and means for actuating said fourth switch when the engine speed is above the idle speed; and means for actuating the duct valve to close off the duct when the throttle valve is closed, the engine speed is above the idling speed, the clutch is engaged and a gear of the gear box is engaged.

2. A fuel injection system in accordance with claim 1 wherein said duct valve is a solenoid valve.

3. A fuel injection system in accordance with claim 2 wherein said duct valve is a diaphragm valve.

4. A fuel injection system in accordance with claims 1, 2 or 3 wherein said means for actuating the duct valve includes a solenoid valve, said switches being in a circuit in which the circuit of the solenoid valve, or a relay which controls the current of the solenoid valve, is located.

5. A fuel injection system according to claim 4, wherein the duct valve is optionally connected to a point of the suction pipe downstream of the throttle valve or to the atmosphere.

6. An internal combustion engine having a fuel injection system according to claim 1.

7. A vehicle having an engine according to claim 6.

* * * * *